Sept. 20, 1960   E. TURNER   2,953,395
MOTORCYCLE FRONT WHEEL SUSPENSION
Filed Dec. 29, 1958   3 Sheets-Sheet 1

Inventor
Edward Turner
By Ralph B. Stewart
attorney

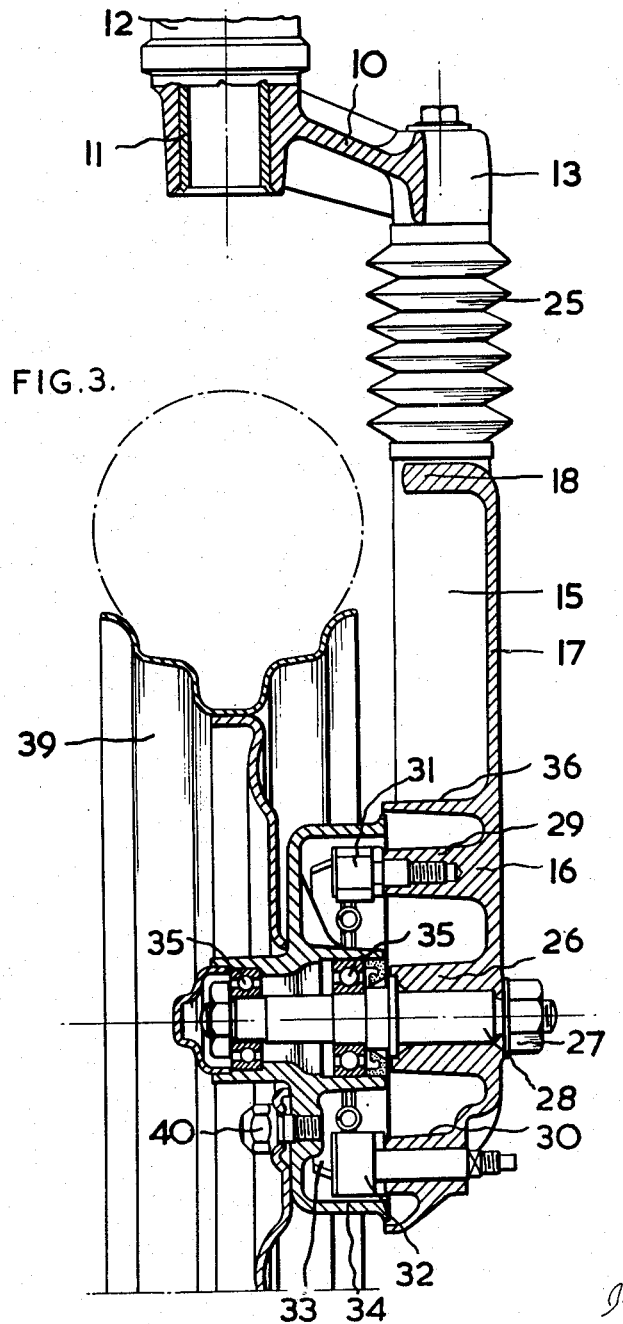

United States Patent Office 2,953,395
Patented Sept. 20, 1960

2,953,395

MOTORCYCLE FRONT WHEEL SUSPENSION

Edward Turner, Birmingham, England, assignor, by mesne assignments, to Triumph Engineering Company Limited, Allesley, England Filed Dec. 29, 1958, Ser. No. 783,399

Claims priority, application Great Britain Jan. 8, 1958

3 Claims. (Cl. 280—276)

This invention relates to improvements in motor scooters and light motor cycles having wheels of small diameter, and is particularly concerned with the mounting of the front wheel.

In ordinary cycles and motor cycles the front wheel is usually mounted in a fork comprising blades extending downwardly on each side of the wheel from a crown fixed on the lower end of the steering stem, but in scooters it is usual to use an overhung wheel supported from one side only so that the wheel can be readily changed if the tyre is punctured.

According to our invention, the spindle of the front wheel of a motor scooter or the like is carried by an assembly including two parallel hollow telescopic limbs of which one houses a spring or springs for supporting the load on the wheel and the other houses an hydraulic dash-pot or damper.

The upper ends of the telescopic limbs are secured in a bifurcated crown fixed on and extending laterally from the lower end of the steering stem. The lower part of the assembly which carries the wheel spindle preferably also forms a back-plate of an internal shoe drum brake of which the drum is rotatably mounted on ball or roller bearings on the spindle, the wheel being detachably bolted to the drum.

One practical form of suspension for the front wheel of a motor scooter is illustrated by way of example in the accompanying drawings in which:

Figure 3 is a section on the line 3—3 of Figure 2.

Figure 1:
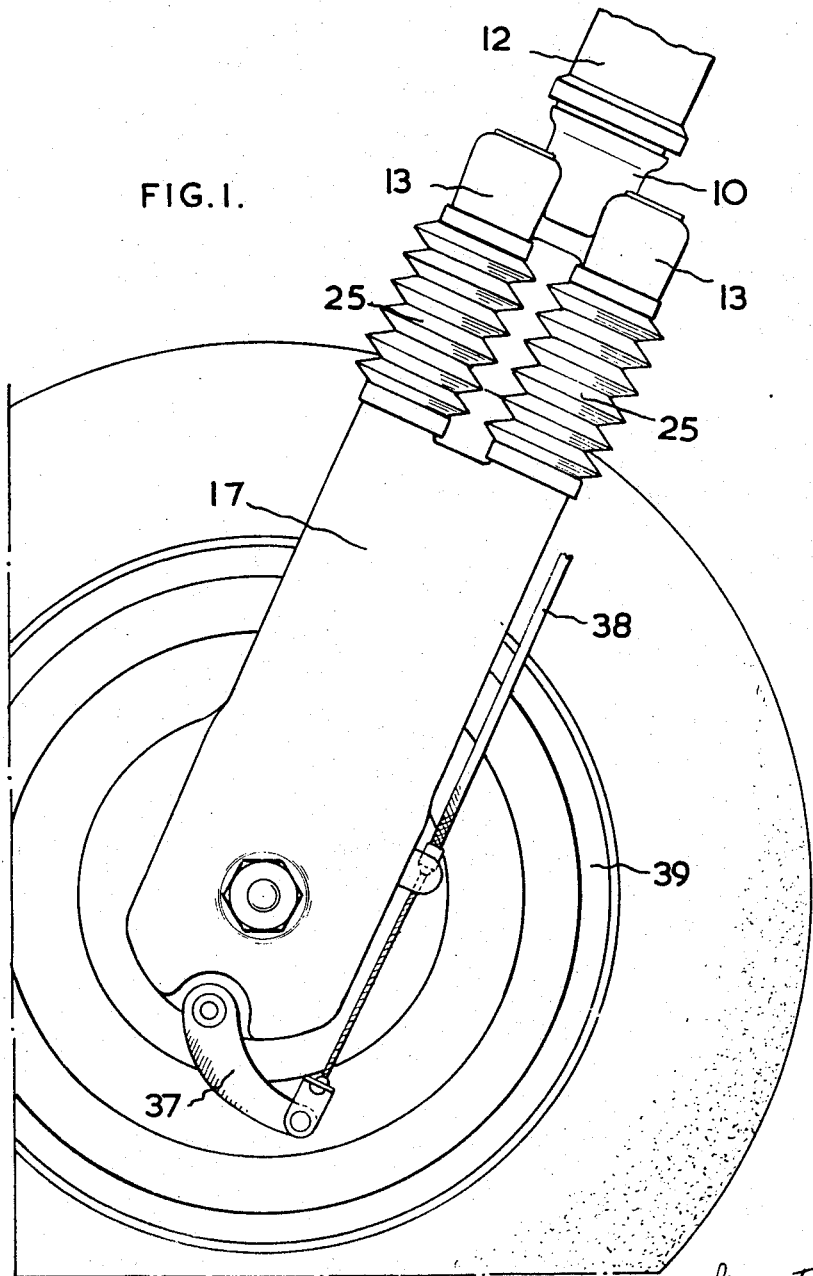
Figure 1 is a side elevation of the suspension unit and wheel.
Figure 2:
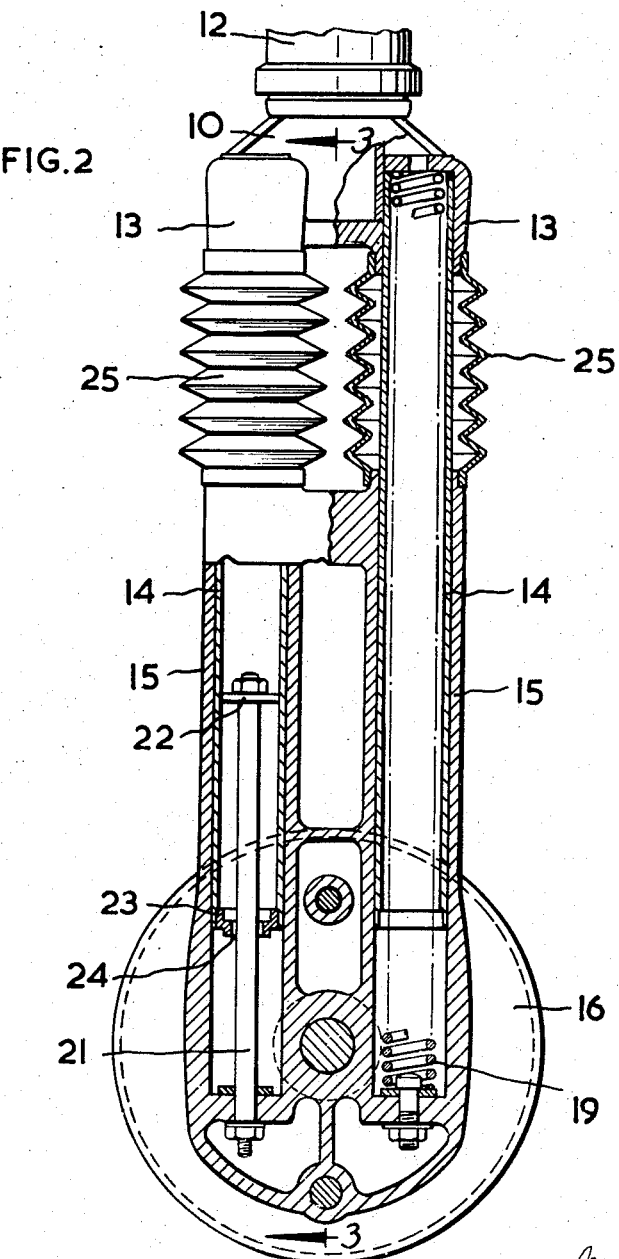
Figure 2 is a side elevation in part section of the suspension unit alone.

In the drawings, 10 is a fork crown which is secured to the lower end of the steering stem 11 which is mounted in the usual way for angular movement in the head 12 of the scooter. The crown is a forging and extends laterally and downwardly from the lower end of the steering stem and terminates in two spaced parallel cylindrical sockets 13 of which the axes are parallel to the axis of the steering stem.

Two rigid tubes 14 of substantial length are brazed or otherwise secured at their upper ends into the sockets 13. The lower parts of these tubes engage slidably in spaced parallel sleeves 15 integral with and extending upwardly from a substantially circular housing 16, the sleeves and housing forming a unit which is conveniently die-cast in light alloy. Above the housing the sleeves are rigidly connected by a web 17 which is thickened at its upper end as shown at 18 and may also be thickened at one or more intermediate points.

A helical compression spring 19 to take the load on the wheel is located in one of the telescopic limbs formed by a tube 14 and sleeve 15, the spring abutting between the socket in which the upper end of the tube is secured, and the closed bottom end of the sleeve. The ends of the spring may be anchored by screwing them on to helical grooves in bolts screwed downwardly through the socket and upwardly through the lower end of the sleeve respectively. In some cases two springs may be employed instead of one.

The other telescopic limb houses an hydraulic dash-pot controlling the action of the spring or springs. A rod 21 is fixed at its lower end in the bottom of the sleeve and extends axially upwards into the lower part of the tube and carries on its upper end a piston 22 which is a close working fit in the tube. The rod extends through an axial opening in a plug 23 mounted in the lower end of the tube, the diameter of the opening being slightly greater than that of the rod to provide around the rod an annular passage 24 of restricted area.

The space around the rod is filled with a viscous liquid and relative axial movement between the tube and the sleeve is damped by the displacement of liquid through the passage 24. The liquid employed is preferably one of which the viscosity does not vary appreciably with temperature.

The dash-pot illustrated may be replaced by an hydraulic damper of any convenient known type and a spring may be arranged between the piston 22 and the socket at the upper end of the tube.

In the alternative arrangement a spring and a dash-pot or damper may be located in each of the telescopic limbs.

The upper part of each tube 14 is enclosed by a flexible bellows or boot 25 secured at its upper end to the socket 13 and at its lower end to the upper end of the sleeve 15 to prevent access of dust or mud.

In an alternative arrangement a rigid shroud attached to the fork crown 10 and extending over the sleeve member 15 protects the bearing surfaces from the ingress of dust and mud over the full movement range.

The circular housing 16 at the lower ends of the sleeves has on its inner face an integral central boss 26 in which is secured by means of a nut 27 one end of the wheel spindle 28 of which the axis is at right angles to the plane containing the axes of the tubes and sleeves. Further bosses 29 and 30 receive an anchorage 31 and a cam-shaft 32 for the shoes 33 of an internal shoe drum brake. The drum 34 of the brake is rotatably mounted on ball bearings 35 on the spindle 27, the free peripheral edge of the drum lying just within an annular flange 36 on the housing.

The spindle of the cam 32 has keyed on it a lever 37, seen in Figure 1, actuated by a Bowden cable 38 from a hand level or pedal.

The wheel 39 is detachably secured to the drum 34 by studs and nuts 40, and the dimensions of the various parts are such that the central plane of the wheel is in alignment with the axis of the steering stem 11.

I claim:

1. Suspension for the front wheel of a light two-wheeled vehicle in which the wheel is rotatably mounted on a spindle supported at one end only, comprising a steering stem, a bifurcated crown fixed on and extending laterally from the lower end of said stem and incorporating two spaced parallel sockets, two parallel tubes secured at their upper ends in said sockets, two parallel sleeves in which the lower parts of said tubes are slidably engaged, the axes of the tubes and sleeves being in a plane at right angles to the axis of said spindle, a housing carried by the lower ends of said sleeves and adapted to receive one end of said spindle, a spring for supporting the load on the wheel located in the assembly formed by one tube and sleeve, and an hydraulic damper in the assembly formed by the other tube and sleeve.

2. Suspension for the front wheel of a light two-wheeled vehicle as in claim 1 further comprising an integral web connecting said parallel sleeves.

3. Suspension for the front wheel of a light two-wheeled vehicle as in claim 1 wherein said housing carried by the lower ends of said sleeves is integral with the sleeves and forms a circular back-plate for a shoe drum brake, and including brake shoes and actuating means therefor mounted on said back plate, and a brake drum rotatably mounted on the wheel spindle and to which the wheel is secured.

References Cited in the file of this patent

UNITED STATES PATENTS

| | | |
|---|---|---|
| 2,329,249 | Carlson | Sept. 14, 1943 |
| 2,851,904 | Banek | Sept. 16, 1958 |

FOREIGN PATENTS

| | | |
|---|---|---|
| 1,067,404 | France | Jan. 27, 1954 |
| 814,110 | Germany | Sept. 20, 1951 |